US006171707B1

(12) United States Patent
Gomez et al.

(10) Patent No.: US 6,171,707 B1
(45) Date of Patent: Jan. 9, 2001

(54) POLYMERIC FILM BASE HAVING A COATING LAYER OF ORGANIC SOLVENT BASED POLYMER WITH A FLUORINATED ANTISTATIC AGENT

(75) Inventors: Charles W. Gomez, Cottage Grove; Steven R. Austin, Maplewood, both of MN (US)

(73) Assignee: 3M Innovative Properties Company, St. Paul, MN (US)

( * ) Notice: Under 35 U.S.C. 154(b), the term of this patent shall be extended for 0 days.

(21) Appl. No.: 08/183,058

(22) Filed: Jan. 18, 1994

(51) Int. Cl.[7] ..................... B32B 27/36

(52) U.S. Cl. ..................... 428/480; 428/532; 428/922

(58) Field of Search ..................... 428/480, 532, 428/922, 96, 97, 421

(56) References Cited

U.S. PATENT DOCUMENTS

| | | | |
|---|---|---|---|
| 2,274,782 | 3/1942 | Gáspár | 430/510 |
| 2,489,341 | 11/1949 | Waller et al. | 430/642 |
| 2,527,583 | 10/1950 | Silberstein et al. | 430/507 |
| 2,565,418 | 8/1951 | Yackel | 430/569 |
| 2,588,765 | 3/1952 | Robijns | 430/502 |
| 2,614,928 | 10/1952 | Yutzy et al. | 430/569 |
| 2,618,556 | 11/1952 | Hewitson et al. | 430/569 |
| 2,681,294 | 6/1954 | Beguin | 430/523 |
| 2,701,245 | 2/1955 | Lynn | 526/214 |
| 2,761,791 | 9/1956 | Russell | 430/502 |
| 2,861,056 | 11/1958 | Minsk | 525/327.7 |
| 2,956,879 | 10/1960 | Van Campen | 430/561 |
| 2,960,404 | 11/1960 | Milton et al. | 430/638 |
| 2,992,101 | 7/1961 | Jelley et al. | 430/357 |
| 3,080,254 | 3/1963 | Grant, Jr. | 430/616 |
| 3,121,060 | 2/1964 | Duane | 430/539 |
| 3,206,312 | 9/1965 | Sterman et al. | 430/529 |
| 3,241,969 | 3/1966 | Hart et al. | 430/628 |
| 3,253,921 | 5/1966 | Sawdey | 430/507 |
| 3,282,699 | 11/1966 | Jones et al. | 430/518 |
| 3,301,678 | 1/1967 | Humphlett et al. | 430/352 |
| 3,330,663 | 7/1967 | Weyde et al. | 430/627 |
| 3,428,451 | 2/1969 | Trevoy | 430/63 |
| 3,432,300 | 3/1969 | Lestina et al. | 430/505 |
| 3,573,050 | 3/1971 | Brannock et al. | 430/512 |
| 3,574,627 | 4/1971 | Stern et al. | 430/551 |
| 3,698,909 | 10/1972 | Lestina et al. | 430/372 |
| 3,700,458 | 10/1972 | Lindholm | 430/619 |
| 3,719,495 | 3/1973 | Lea | 430/578 |
| 3,761,279 | 9/1973 | deMauriac et al. | 430/353 |
| 3,764,337 | 10/1973 | Arai et al. | 430/551 |
| 3,785,830 | 1/1974 | Sullivan et al. | 430/353 |
| 3,847,612 | 11/1974 | Winslow | 430/203 |
| 3,877,943 | 4/1975 | Masuda | 430/495.1 |
| 3,884,699 * | 5/1975 | Cavallo et al. | 96/87 A |
| 3,985,565 | 10/1976 | Gabrielsen et al. | 430/559 |
| 4,021,240 | 5/1977 | Cerquone et al. | 430/203 |
| 4,042,394 | 8/1977 | Smith, Jr. et al. | 430/9 |
| 4,123,274 | 10/1978 | Knight et al. | 430/336 |
| 4,123,282 | 10/1978 | Winslow | 430/619 |
| 4,220,709 | 9/1980 | deMauriac | 430/353 |
| 4,266,015 * | 5/1981 | Butler et al. | 430/527 |
| 4,374,821 | 2/1983 | Glavan et al. | 424/1.77 |
| 4,374,921 | 2/1983 | Frenchik | 430/338 |
| 4,460,681 | 7/1984 | Frenchik | 430/502 |
| 4,477,562 | 10/1984 | Zeller-Pendrey | 430/513 |
| 4,570,197 * | 2/1986 | Hakanson et al. | 360/132 |
| 4,678,739 | 7/1987 | Kitaguchi et al. | 430/353 |
| 4,708,928 | 11/1987 | Geisler | 430/619 |
| 4,761,361 | 8/1988 | Ozaki et al. | 430/203 |
| 4,775,613 | 10/1988 | Hirai et al. | 430/505 |
| 4,847,188 | 7/1989 | Komamura et al. | 430/545 |
| 4,883,747 | 11/1989 | Grieve et al. | 430/542 |
| 4,975,363 * | 12/1990 | Cavallo et al. | 430/637 |
| 5,064,742 | 11/1991 | Aono et al. | 430/203 |
| 5,217,767 * | 6/1993 | Gutman et al. | 428/35.3 |

FOREIGN PATENT DOCUMENTS

| | | |
|---|---|---|
| 0260953B1 | 3/1988 | (EP) . |
| 0300259 B1 | 1/1989 | (EP) . |
| 837095 | 6/1960 | (GB) . |
| 955061 | 4/1964 | (GB) . |
| 1326889 | 8/1973 | (GB) . |
| 1422057 | 1/1976 | (GB) . |
| 1439402 | 6/1976 | (GB) . |
| 1466201 | 3/1977 | (GB) . |
| 1469117 | 3/1977 | (GB) . |

OTHER PUBLICATIONS

"Photothermographic sliver halide systems", *Research Disclosure*, Item No. 17029, Jun. 1978.

"Photothermographic silver halide material and process", *Research Disclosure*, Item No. 22812, Apr. 1983.

"Carbamoyloxy substituted couplers in a photothermographic element and process", *Research Disclosure*, Item No. 23419, Oct. 1983.

James, T.H., *The Theory of the Photographic Process*, Fourth Edition, Chapter 5, pp. 149–160 (1977).

* cited by examiner

*Primary Examiner*—D. S. Nakarani

(57) ABSTRACT

Polymeric film may be provided with an antistatic coating comprising an oleophilic polymeric film forming binder and a fluorinated ionic polyoxyalkylene antistatic agent in an organic solvent system. The coated film base with the antistatic layer is particularly useful in preventing static problems in photothermographic elements when thermally developed in heated rollers.

23 Claims, No Drawings

POLYMERIC FILM BASE HAVING A COATING LAYER OF ORGANIC SOLVENT BASED POLYMER WITH A FLUORINATED ANTISTATIC AGENT

The present invention relates to a method for reducing the chargeability of polymeric films, particularly polymeric film base used with photographic layers and photographic elements, to photographic layers and photographic elements obtained with such a method.

A photographic material generally consists of a base, at least one layer of a silver halide emulsion dispersed in a hydrophilic colloidal binder and, possibly, of at least one protective layer for such an emulsion, essentially consisting of a hydrophilic colloidal binder. Such a protective layer can be found either outside or inside such a photographic material (in this last case, for instance in color photographic materials, it is called "interlayer"). It is also known that a photographic material may include sub-layers, antihalation layers and other auxiliary layers adjacent or not the emulsion layers. A photographic material suitable for radiography particularly consists of a base, at least two emulsion layers each coated on one surface of said base and at least two protective layers for said emulsion layers. Such a material may also contain two sub-layers coated between the emulsion layers and the base.

It is further known that it is desirable to produce photographic layers, i.e., emulsion layers and auxiliary layers (such as for instance protective layers, interlayers, sublayers and antihalation layers) exhibiting a reduced static chargeability. During preparation, packaging or use, such layers are prone to stresses which may cause electrostatic charges to be formed, which by discharging produce undesired sensitizations in light-sensitive emulsions. Particularly, a radiographic material should be usable in angiographic tables (AOT) and in rapid machines wherein the film is conveyed at a high speed by means of rollers which exert thereon a strong pressure and friction action.

In such use, strong electrostatic charges are formed at the surface of contact between the protective layer and the rollers, thus giving rise to undesired sensitizations. Such sensitizations are equivalent to undesired exposures and after the processing sequence the photographic element will have variedly shaped specks which can be found above all along the film sides where the contact rollers/protective layers occurs.

In addition to a reduced chargeability, radiographic materials suitable for AOT must exhibit a rather high slipperiness index which reduces the dangers of the apparatus jamming. In some cases, indeed, the slipperiness index can be related to the static chargeability itself.

The chargeability of the layers is generally due to the fact that the layers essentially consist of gelatin or of another hydrophilic colloidal binder equivalent to gelatin which exhibits a low work function, i.e., a positive type chargeability. Such a chargeability is generally modified by the presence of surfactants which induce a positive or a negative type chargeability into the layers according to their nature. "Non-fluorinated" anionic surfactants of the type known to those skilled in the art generally induce a positive type chargeability into the layers. Fluorinated anionic, non-ionic N-oxide or betaine surfactants induce a negative type chargeability into the same layers. Betaine and/or N-oxide non-fluorinated surfactants in combination with non-fluorinated anionic surfactants do not substantially improve the static characteristics of the photographic layers, while on the contrary they improve slipperiness characteristics. Fluorinated surfactants in combination with anionic non-fluorinated surfactants improve the static characteristics of the photographic layers only at a certain range of relative humidity and leave slipperiness characteristics unaltered.

Fluorinated compounds, fluorinated polymers and mixtures of those materials have been used for antistatic protection in polymer films and particularly in photographic media for many years. U.S. Pat. No. 3,884,699 shows the use of combinations of fluorinated anionic surfactants and non-fluorinated betaines and/or N-oxide surfactants in coated layers to reduce static charging in photographic film. U.S. Pat. No. 4,570,197 shows a surface coating of a fluorinated surfactant and antistatic agent on polymeric materials to reduce static charging. U.S. Pat. No. 4,266,015 shows the use of fluorinated polymers as coating materials or additives to coatings to reduce static charging. Many different fluorinated materials have been designed over the years to provide specific types of properties, including antistatic properties.

Certain quaternary nitrogen polyoxyalkylene compounds with perfluorinated sulfonyl anions have been used commercially in water based polymer systems (e.g., polyvinyl alcohol) as antistatic coating materials. These coatings provide reasonable antistatic protection when coated out, but the water-based coating technology has extremely limited areas of utility. The fact that these fluorinated antistatic agents are easily coated out of water-based compositions, and their highly polar and hydrophilic nature do not suggest any utility for organic solvent based, oleophilic polymer coating systems.

U.S. Pat. No. 4,975,363 discloses the use of antistatic agents, including some of the compounds use within the practice of the present invention, as antistatic agents in photographic elements. The use of water, acetone, alcohol or mixtures thereof as solvents is shown on column 13, lines 28–35.

SUMMARY OF THE INVENTION

The antistatic properties of polymeric films, particularly polymeric film base used for imaging systems, and particularly photographic polymeric film base may be improved by the use of a coating comprising an organic solvent-based film forming polymeric binder and at least 0.005% by weight of a di-quaternary nitrogen polyoxyalkylene compound having highly fluorinated alkylsulfonyl anions. This coating layer may also be used as an auxiliary layer in a photographic element, such as an antihalation layer, so that a single layer provides two functions to the photographic element.

DETAILED DESCRIPTION OF THE INVENTION

Highly fluorinated compounds are well known as antistatic agents for specific fields of uses and in specific types of chemical compositions. It has been found in the practice of the present invention that a certain class of fluorinated compound previously known to be useful only in water-based hydrophilic polymers as an antistatic agent has good utility as an antistatic agent in organic solvent based oleophilic polymer coatings. These antistatic coatings are particularly useful on polymeric film base for imaging technologies and most particularly useful on photographic film base. The coatings work particularly well on film base or media which is heated (e.g., thermally developed) and transported by rollers, as is photothermographic media.

The compounds useful in the practice of the present invention may be generally described by the formulae:

$$(R_fSO_3^-)^+NR_3(R^1O)_m(R^2O)_n(R^3)_p{}^+NR_3(^-SO_3R_f) \quad (I)$$

$$(R_fSO_3)^{-+}NR_3(CH_2CH_2O)_m(CH_2CH_2CH_2O)_n(CH_2)_pN^+R_3^-(SO_3R_f) \quad (II)$$

wherein each $R_f$ is independently a highly fluorinated alkyl group of 1 to 20 carbon atoms, and preferably a perfluorinated alkyl group of 1 to 20 carbon atoms, $R^1O$ is ethyleneoxy, propyleneoxy, or (less preferably) butyleneoxy including branched variations thereof (e.g., isopropyleneoxy, isobutyleneoxy, etc.), $R^2O$ is ethyleneoxy, propyleneoxy, or (less preferably) butyleneoxy, including branched variations thereof, $R^3$ is alkylene of 1 to 8 carbon atoms (including branched or substituted variations thereof, such as alkoxy or halogen-substituted alkylene), R is H, or alkyl group of 1 to 20 carbon atoms, preferably H or an alkyl group of 1 to 4 carbon atoms, m is 0 to 20, n is 0 to 20, m plus n equals at least 2, and p is 1 to 8.

The term highly fluorinated alkyl group is well understood in the art and according to the practice of the present invention represents a group in which at least two out of three groups replacing hydrogen on the alkyl group are fluorine and all of the substituents on the carbon atom adjacent the sulfonyl group are fluorine. Such substituent groups other than fluorine would preferably include other strong electron donating groups such as chlorine. The $R_f$ group when not perfluorinated should be intermediate in electron donating effects between perfluorinated groups and hydrogen, and the closer that property to that of the perfluorinated group, the better.

The preferred compound of the class is $$C_8F_{17}SO_3^-NH_3^+(CH_2CH_2O)_{12}CH_2CH_2NH_3^{+-}SO_3C_8F_{17}$$

As previously noted, these compounds are known in the art as water based hydrophilic polymer additives. The oleophilic (hydrophobic) polymer coatings of the present invention are organic solvent based and may be coated as any of the auxiliary coating layers on photographic media. For example, the polymer layer containing the antistatic additives of the present invention may be antihalation layers, filter layers, barrier layers, topcoats, abrasion resistant layers, or the like. Any oleophilic film forming polymer may be used as the binder for this antistatic system, but when the image must be viewed through the antistatic layer, optically clear polymers are of course preferred. Amongst the more useful polymer binders are polyesters, polyvinyl acetals, cellulose acetates (and their ester derivatives such as cellulose acetate butyrate and cellulose acetate propionate), polyvinylidene chloride, mixtures of these binders and the like.

The most preferred solvents for use in the practice of the present invention are ketones (e.g., methyl ethyl ketone, methyl isobutyl ketone) and dimethyl formamide. The solvents rea selected, of course, to dissolve the oleophilic (hydrophobic) film forming binder and solvent selection should be based upon the effectiveness of the solvent with the particular binder. However, when a photographic or photothermographic element is being constructed, the solvent must also be chosen so that the photographic or photothermographic emulsion is not damaged. The solvents should be semipolar in the practice of the present invention to facilitate the dissolution of the antistatic agent and be compatible with the oleophilic binder. The use of water, acetone, alcohol and combinations thereof suggested in U.S. Pat. No. 4,975,363 does not teach the practice of the present invention. Those materials include water or would be understood by one of ordinary skill in the art to be used with large concentrations of water in normal commercial procedures. For example, with acetone, water would have to be used to prevent the rapid evaporation of that solvent. High concentrations of alcohol could also tend to destabilize the emulsions in photographic or photothermographic systems. Therefore the disclosure of U.S. Pat. No. 4,975,363 on column 13, lines 28–35 would be understood to be an aqueous or aqueous/organic system. The present invention would prefer using solvent systems with minimum water content, such as less than 5% by weight water with respect to the weight of the organic solvent, preferably less than 3%, more preferably less than 2%, and most preferably less than 1% by weight of water present as compared to the weight of the organic solvent.

The antistatic film base of the present invention may be used in any imaging media, such as thermal transfer, thermal diffusion, photothermography, photography, and the like. In the photographic area, the base may be used in any photographic format, such as amateur film or print, black-and-white film or print, radiographic imaging, non-destructive testing X-ray imaging, contact film, negatives, positives, and all the other various forms of photographic materials.

The photothermographic emulsions of this invention may be constructed of one or more layers on a substrate. Single layer constructions must contain the silver source material, the silver halide, the developer and binder as well as optional additional materials such as toners, coating aids, and other adjuvants. Two-layer constructions must contain the silver source and silver halide in one emulsion layer (usually the layer adjacent to the substrate) and some of the other ingredients in the second layer or both layers, although two layer constructions comprising a single emulsion layer containing all the ingredients and a protective topcoat are envisioned. Multicolor photothermographic constructions may contain sets of these bilayers for each color, or they may contain all ingredients within a single layer as described in U.S. Pat. No. 4,708,928. In the case of multilayer multicolor photothermographic articles the various emulsion layers are generally maintained distinct from each other by the use of functional or non-functional barrier layers between the various photosensitive layers as described in U.S. Pat. No. 4,460,681.

While not necessary for practice of the present invention, it may be advantageous to add mercury (II) salts to the emulsion layer(s) as an antifoggant. Preferred mercury (II) salts for this purpose are mercuric acetate and mercuric bromide.

The light sensitive silver halide used in the present invention may typically be employed in a range of 0.75 to 25 mol percent and, preferably, from 2 to 20 mol percent of organic silver salt.

The silver halide may be any photosensitive silver halide such as silver bromide, silver iodide, silver chloride, silver bromoiodide, silver chlorobromoiodide, silver chlorobromide, etc. The silver halide may be in any form which is photosensitive including, but not limited to cubic, orthorhombic, tabular, tetrahedral, etc., and may have epitaxial growth of crystals thereon.

The silver halide used in the present invention may be employed without modification. However, it may be chemically sensitized with a chemical sensitizing agent such as a compound containing sulfur, selenium or tellurium etc., or a compound containing gold, platinum, palladium, rhodium or iridium, etc., a reducing agent such as a tin halide, etc., or a combination thereof. The details of these procedures are described in T. H. James "The Theory of the Photographic Process", Fourth Edition, Chapter 5, pages 149 to 160.

The silver halide may be added to the emulsion layer in any fashion which places it in catalytic proximity to the silver source. Silver halide and the organic silver salt which are separately formed or "preformed" in a binder can be mixed prior to use to prepare a coating solution, but it is also effective to blend both of them in a ball mill for a long period of time. Further, it is effective to use a process which comprises adding a halogen-containing compound in the organic silver salt prepared to partially convert the silver of the organic silver salt to silver halide.

Methods of preparing these silver halide and organic silver salts and manners of blending them are known in the art and described in *Research Disclosure*, June 1978, item 17029, and U.S. Pat. No. 3,700,458.

The use of preformed silver halide emulsions of this invention can be unwashed or washed to remove soluble salts. In the latter case the soluble salts can be removed by chill-setting and leaching or the emulsion can be coagulation washed, e.g., by the procedures described in U.S. Pat. Nos. 2,618,556; 2,614,928; 2,565,418; 3,241,969; and 2,489,341. The silver halide grains may have any crystalline habit including, but not limited to cubic, tetrahedral, orthorhombic, tabular, laminar, platelet, etc.

The organic silver salt may be any organic material which contains a reducible source of silver ions. Silver salts of organic acids, particularly long chain (10 to 30 preferably 15 to 28 carbon atoms) fatty carboxylic acids are preferred. Complexes of organic or inorganic silver salts wherein the ligand has a gross stability constant between 4.0 and 10.0 are also desirable. The silver source material should preferably constitute from about 5 to 30 percent by weight of the imaging layer.

The organic silver salt which can be used in the present invention is a silver salt which is comparatively stable to light, but forms a silver image when heated to 80° C. or higher in the presence of an exposed photocatalyst (such as photographic silver halide) and a reducing agent.

Preferred organic silver salts include silver salts of organic compounds having a carboxy group. Non-limiting examples thereof include silver salts of an aliphatic carboxylic acid and a silver salt of an aromatic carboxylic acid. Preferred examples of the silver salts of aliphatic carboxylic acids include silver behenate, silver stearate, silver oleate, silver laurate, silver caproate, silver myristate, silver palmitate, silver maleate, silver fumarate, silver tartrate, silver linoleate, silver butyrate and silver camphorate, mixtures thereof, etc. Silver salts with a halogen atom or a hydroxyl on the aliphatic carboxylic acid can also be effectively used. Preferred examples of the silver salts of aromatic carboxylic acids and other carboxyl group-containing compounds include silver benzoate, a silver substituted benzoate such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenyl benzoate, etc., silver gallate, silver tannate, silver phthalate, silver terephthalate, silver salicylate, silver phenylacetate, silver pyromellitate, a silver salt of 3-carboxymethyl-4-methyl-4-thiazoline-2-thione or the like as described in U.S. Pat. No. 3,785,830, and silver salt of an aliphatic carboxylic acid containing a thioether group as described in U.S. Pat. No. 3,330,663, etc.

Silver salts of compounds containing mercapto or thione groups and derivatives thereof can also be used. Preferred examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-(ethylglycolamido) benzothiazole, a silver salt of thioglycolic acid such as a silver salt of an S-alkyl thioglycolic acid (wherein the alkyl group has from 12 to 22 carbon atoms), a silver salt of a dithiocarboxylic acid such as a silver salt of dithioacetic acid, a silver salt of a thioamide, a silver salt of 5-carboxylic-1-methyl-2-phenyl-4-thiopyridine, a silver salt of mercaptotriazine, a silver salt of 2-mercaptobenzoxazole, a silver salt as described in U.S. Pat. No. 4,123,274, for example, a silver salt of 1,2,4-mercaptotriazole derivative such as a silver salt of 3-amino-5-benzylthio-1,2,4-triazole, a silver salt of a thione compound such as a silver salt of 3-(2-carboxyethyl)-4-methyl-4-thiazoline-2-thione as disclosed in U.S. Pat. No. 3,301,678.

Furthermore, a silver salt of a compound containing an imino group may be used. Preferred examples of these compounds include silver salts of benzotriazole and derivatives thereof, for example, silver salts of benzotriazoles such as silver methylbenzotriazolate, etc., silver salt of halogen-substituted benzotriazoles, such as silver 5-chlorobenzotriazolate, etc., silver salts of carboimidobenzotriazole, etc., silver salt of 1,2,4-triazoles or 1-H-tetrazoles as described in U.S. Pat. No. 4,220,709, silver salts of imidazoles and imidazole derivatives, and the like. Various silver acetylide compounds can also be used, for instance, as described in U.S. Pat. Nos. 4,761,361 and 4,775,613.

It is also found convenient to use silver half soaps, of which an equimolar blend of silver behenate and behenic acid, prepared by precipitation from aqueous solution of the sodium salt of commercial behenic acid and analyzing about 14.5 percent silver, represents a preferred example. Transparent sheet materials made on transparent film backing require a transparent coating and for this purpose the silver behenate full soap, containing not more than about four or five percent of free behenic acid and analyzing about 25.2 percent silver may be used.

The method used for making silver soap dispersions is well known in the art and is disclosed in *Research Disclosure*, April 1983, item 22812, *Research Disclosure*, October 1983, item 23419 and U.S. Pat. No. 3,985,565.

The light-sensitive silver halides may be advantageously spectrally sensitized with various known dyes including cyanine, merocyanine, styryl, hemicyanine, oxonol, hemioxonol and xanthene dyes. Useful cyanine dyes include those having a basic nucleus, such as a thiazoline nucleus, an oxazoline nucleus, a pyrroline nucleus, a pyridine nucleus, an oxazole nucleus, a thiazole nucleus, a selenazole nucleus and an imidazole nucleus. Useful merocyanine dyes which are preferred include those having not only the above described basic nuclei but also acid nuclei, such as a thiohydantoin nucleus, a rhodanine nucleus, an oxazolidinedione nucleus, a thiazolidinedione nucleus, a barbituric acid nucleus, a thiazolinone nucleus, a malononitrile nucleus and a pyrazolone nucleus. In the above described cyanine and merocyanine dyes, those having imino groups or carboxyl groups are particularly effective. Practically, the sensitizing dyes to be used in the present invention may be properly selected from known dyes such as those described in U.S. Pat. Nos. 3,761,279, 3,719,495, and 3,877,943, British Pat. Nos. 1,466,201, 1,469,117 and 1,422,057, and can be located in the vicinity of the photocatalyst according to known methods. Spectral sensitizing dyes may be typically used in amounts of about $10^{-4}$ mol to about 1 mol per 1 mol of silver halide.

The reducing agent for the organic silver salt may be any material, preferably organic material, that can reduce silver ion to metallic silver. Conventional photographic developers such as phenidone, hydroquinones, and catechol are useful but hindered phenol reducing agents are preferred. The reducing agent should be present as 1 to 10 percent by weight of the imaging layer. In multilayer constructions, if the reducing agent is added to a layer other than an emulsion layer, slightly higher proportions, of from about 2 to 15 percent tend to be more desirable.

A wide range of reducing agents have been disclosed in dry silver systems including amidoximes such as phenylamidoxime, 2-thienylamidoxime and p-phenoxyphenylamidoxime, azines (e.g., 4-hydroxy-3,5-dimethoxybenzaldehydeazine); a combination of aliphatic carboxylic acid aryl hydrazides and ascorbic acid, such as 2,2'-bis(hydroxymethyl)propionyl-β-phenylhydrazide in combination with ascorbic acid; a combination of polyhydroxybenzene and hydroxylamine, a reductone and/or a hydrazine (e.g., a combination of hydroquinone and bis (ethoxyethyl)hydroxylamine, piperidinohexose reductone or formyl-4-methylphenylhydrazine); hydroxamic acids such as phenylhydroxamic acid, p-hydroxyphenylhydroxamic acid, and β-alaninehydroxamic acid; a combination of azines and sulfonamidophenols, (e.g., phenothiazine and 2,6-dichloro-4-benzenesulfonamidophenol); α-cyanophenylacetic acid derivatives such as ethyl-α-cyano-2 -methylphenylacetate, ethyl α-cyanophenylacetate; bis-β-naphthols as illustrated by 2,2'-dihydroxyl-1-binaphthyl, 6,6'-dibromo-2,2'-dihydroxy-1,1'-binaphthyl, and bis(2-hydroxy-1-naphthyl)methane; a combination of bis-β-naphthol and a 1,3-dihydroxybenzene derivative, (e.g., 2,4-dihydroxybenzophenone or 2,4-dihydroxyacetophenone); 5-pyrazolones such as 3-methyl-1-phenyl-5-pyrazolone; reductones as illustrated by dimethylaminohexose reductone, anhydrodihydroaminohexose reductone, and anhydrodihydropiperidonehexose reductone; sulfonamido-phenol reducing agents such as 2,6-dichloro-4-benzenesulfonamidophenol, and p-benzenesulfonamidophenol; 2-phenylindane-1,3-dione and the like; chromans such as 2,2-dimethyl-7-t-butyl-6-hydroxychroman; 1,4-dihydropyridines such as 2,6-dimethoxy-3,5-dicarboethoxy-1,4-dihydropyridine; bisphenols (e.g., bis(2-hydroxy-3-t-butyl-5-methylphenyl) methane, 2,2-bis(4-hydroxy-3-methylphenyl)propane, 4,4-ethylidene-bis(2-t-butyl-6-methylphenol), and 2,2-bis(3,5-dimethyl-4-hydroxyphenyl)propane); ascorbic acid derivatives (e.g., 1-ascorbyl palmitate, ascorbyl stearate); and unsaturated aldehydes and ketones, such as benzil and biacetyl; 3-pyrazolidones and certain indane-1,3-diones.

In addition to the aforementioned ingredients, it may be advantageous to include additives known as "toners" that improve the image. Toner materials may be present, for example, in amounts from 0.1 to 10 percent by weight of all silver bearing components. Toners are well known materials in the photothermographic art as shown in U.S. Pat. Nos. 3,080,254; 3,847,612 and 4,123,282.

Examples of toners include phthalimide and N-hydroxyphthalimide; cyclic imides such as succinimide, pyrazoline-5-ones, and a quinazolinone, 3-phenyl-2-pyrazoline-5-one, 1-phenylurazole, quinazoline, and 2,4-thiazolidinedione; naphthalimides (e.g., N-hydroxy-1,8-naphthalimide); cobalt complexes (e.g., cobaltic hexammine trifluoroacetate); mercaptans as illustrated by 3-mercapto-1,2,4-triazole, 2,4-dimercaptopyrimidine, 3-mercapto-4,5-diphenyl-1,2,4-triazole and 2,5-dimercapto-1,3,4-thiadiazole; N-(aminomethyl)aryldicarboximides, (e.g., (N,N-dimethylaminomethyl)phthalimide, and N,N-(dimethylaminomethyl)naphthalene-2,3-dicarboximide); and a combination of blocked pyrazoles, isothiuronium derivatives and certain photobleaching agents (e.g., a combination of N,N'-hexamethylene bis(1-carbamoyl-3,5-dimethylpyrazole), 1,8-(3,6-diazaoctane)bis(isothiuronium trifluoroacetate) and 2-(tribromomethylsulfonyl) benzothiazole); and merocyanine dyes such as 3-ethyl-5[(3-ethyl-2-benzothiazolinylidene)-1-methylethylidene]-2-thio-2,4-oxazolidinedione; phthalazinone and phthalazinone derivatives or metal salts or these derivatives such as 4-(1-naphthyl)phthalazinone, 6-chlorophthalazinone, 5,7-dimethoxyphthalazinone, and 2,3-dihydro-1,4-phthalazinedione; a combination of phthalazinone plus sulfinic acid derivatives (e.g., phthalic acid, 4-methylphthalic acid, 4-nitrophthalic acid, and tetrachlorophthalic anhydride); quinazolinediones, benzoxazine or naphthoxazine derivatives; rhodium complexes functioning not only as tone modifiers, but also as sources of halide ion for silver halide formation in situ, such as ammonium hexachlororhodate (III), rhodium bromide, rhodium nitrate and potassium hexachlororhodate (III); inorganic peroxides and persulfates (e.g., ammonium peroxydisulfate and hydrogen peroxide); benzoxazine-2,4-diones such as 1,3-benzoxazine-2,4-dione, 8-methyl-1,3-benzoxazine-2,4-dione, and 6-nitro-1,3-benzoxazine-2,4-dione; pyrimidines and asymmetric triazines (e.g., 2,4 -dihydroxypyrimidine, 2-hydroxy-4-aminopyrimidine), azauracils, and tetrazapentalene derivatives (e.g, 3,6-dimercapto-1,4-diphenyl-1H,4H-2,3a,5,6a-tetrazapentalene, and 1,4-di(o-chlorophenyl)-3,6-dimercapto-1H,4H-2,3a,5,6a-tetrazapentalene).

A number of methods are known in the art for obtaining color images with dry silver systems including: a combination of silver benzotriazole, well known magenta, yellow and cyan dye-forming couplers, aminophenol developing agents, a base release agent such as guanidinium trichloroacetate and silver bromide in poly(vinyl butyral) as described in U.S. Pat. Nos. 4,847,188 and 5,064,742; preformed dye release systems such as those described in U.S. Pat. No. 4,678,739; a combination of silver bromoiodide, sulfonamidophenol reducing agent, silver behenate, poly (vinyl butyral), an amine such as n-octadecylamine and 2-equivalent or 4-equivalent cyan, magenta or yellow dye-forming couplers; leuco dye bases which oxidize to form a dye image (e.g., Malachite Green, Crystal Violet and pararosaniline); a combination of in situ silver halide, silver behenate, 3-methyl-1-phenylpyrazolone and N,N'-dimethyl-p-phenylenediamine hydrochloride; incorporating phenolic leuco dye reducing agents such as 2(3,5-di-(t-butyl)-4-hydroxyphenyl)-4,5-diphenylimidazole, and bis(3,5-di-(t-butyl)-4-hydroxyphenyl)phenylmethane, incorporating azomethine dyes or azo dye reducing agents; silver dye bleach processes (for example, an element comprising silver behenate, behenic acid, poly(vinyl butyral), poly(vinyl-butyral)peptized silver bromoiodide emulsion, 2,6-dichloro-4-benzenesulfonamidophenol, 1,8-(3,6-diazaoctane)bis (isothiuronium-p-toluenesulfonate) and an azo dye can be exposed and heat processed to obtain a negative silver image with a uniform distribution of dye, and then laminated to an acid activator sheet comprising polyacrylic acid, thiourea and p-toluenesulfonic acid and heated to obtain well defined positive dye images); and amines such as aminoacetanilide (yellow dye-forming), 3,3'-dimethoxybenzidine (blue dye-forming) or sulfanilide (magenta dye forming) that react with the oxidized form of incorporated reducing agents such as 2,6-dichloro-4-benzenesulfonamidophenol to form dye images. Neutral dye images can be obtained by the addition of amines such as behenylamine and p-anisidine.

Leuco dye oxidation in such silver halide systems for color formation is disclosed in U.S. Pat. Nos. 4,021,240, 4,374,821, 4,460,681 and 4,883,747.

Emulsions of the invention can contain plasticizers and lubricants such as polyalcohols (e.g., glycerin and diols of the type described in U.S. Pat. No. 2,960,404); fatty acids or esters such as those described in U.S. Pat. No. 2,588,765 and U.S. Pat. No. 3,121,060; and silicone resins such as those described in British Pat. No. 955,061.

The emulsions of the present invention may contain additional stabilizers and antifoggants known in the photothermographic art. These may be primary stabilizers and antifoggants or post-processing stabilizers. Amongst the preferred antifoggants are organic compounds having trihalogented and especially tribromomethyl groups. These are often aryl(aromatic) nuclei having the halogenated group either directly attached to the aromatic nucleus or attached through a bridging group (e.g., sulfonyl). Other useful antifoggants include isocyanates, vinyl sulfones, and beta-halogenated sulfones.

The photothermographic elements of the present invention may include image dye stabilizers. Such image dye stabilizers are illustrated by British Pat. No. 1,326,889; U.S. Pat. Nos. 3,432,300; 3,698,909; 3,574,627; 3,573,050; 3,764,337 and 4,042,394.

Photothermographic elements containing emulsion layers according to the present invention can be used in photographic elements which contain light absorbing materials and filter dyes such as those described in U.S. Pat. Nos. 3,253,921; 2,274,782; 2,527,583 and 2,956,879. If desired, the dyes can be mordanted, for example, as described in U.S. Pat. No. 3,282,699.

Photothermographic elements containing emulsion layers as described herein can contain matting agents such as starch, titanium dioxide, zinc oxide, silica, polymeric beads including beads of the type described in U.S. Pat. No. 2,992,101 and U.S. Pat. No. 2,701,245.

Emulsions in accordance with this invention can be used in photothermographic elements which contain antistatic or conducting layers, such as layers that comprise soluble salts (e.g., chlorides, nitrates, etc.), evaporated metal layers, ionic polymers such as those described in U.S. Pat. Nos. 2,861,056 and 3,206,312 or insoluble inorganic salts such as those described in U.S. Pat. No. 3,428,451.

The binder may be selected from any of the well-known natural or synthetic resins such as gelatin, polyvinyl acetals, polyvinyl chloride, polyvinyl acetate, cellulose acetate, polyolefins, polyesters, polystyrene, polyacrylonitrile, polycarbonates, and the like. Copolymers and terpolymers are of course included in these definitions. The preferred photothermographic silver containing polymers are polyvinyl butyral, ethyl cellulose, methacrylate copolymers, maleic anhydride ester copolymers, polystyrene, and butadiene-styrene copolymers.

Optionally, these polymers may be used in combinations of two or more thereof. Such a polymer is used in an amount sufficient to carry the components dispersed therein, that is, within the effective range of the action as the binder. The effective range can be appropriately determined by one skilled in the art. As a guide in the case of carrying at least an organic silver salt, it can be said that a preferable ratio of the binder to the organic silver salt ranges from 15:1 to 1:2, and particularly from 8:1 to 1:1.

Photothermographic emulsions according to the present invention may be coated on a wide variety of supports. Typical supports include polyester film, subbed polyester film, poly(ethylene terephthalate)film, cellulose nitrate film, cellulose ester film, poly(vinyl acetal) film, polycarbonate film and related or resinous materials, as well as glass, paper, metal and the like. Typically, a flexible support is employed, especially a paper support, which may be partially acetylated or coated with baryta and/or an α-olefin polymer, particularly a polymer of an α-olefin containing 2 to 10 carbon atoms such as polyethylene, polypropylene, ethylene-butene copolymers and the like. Substrates may be transparent or opaque.

Substrates with a backside resistive heating layer may also be used in photothermographic imaging systems such as shown in U.S. Pat. Nos. 4,460,681, 4,477,562 and 4,374,921.

Photothermographic emulsions of this invention can be coated by various coating procedures including dip coating, air knife coating, curtain coating, or extrusion coating using hoppers of the type described in U.S. Pat. No. 2,681,294. If desired, two or more layers may be coated simultaneously by the procedures described in U.S. Pat. No. 2,761,791 and British Pat. No. 837,095.

Additional layers may be incorporated into photothermographic articles of the present invention such as dye receptive layers for receiving a mobile dye image, an opacifying layer when reflection prints are desired, a protective topcoat layer and a primer layer as is known in the photothermographic art.

These and other aspects of the present invention shall be clear from the following non-limiting examples of the invention.

In the following examples, all static properties have been measured on the E.T.S. static decay meter or the Keithly 6105 surface resitivity meter in a 70° F./20% R.H. chamber.

The following example describes the use of compound 1 of the present invention to control static in a transport promoting, backside coating.

The following solution was made up:

| | | |
|---|---|---|
| A. | MEK | 439.94 g |
| B. | MIBK | 20.00 g |
| C. | Superflex 200 ($CaCO_3$, Pfizer) | 0.06 g |
| D. | Vital PE 200 resin (polyester, Goodyear) | 0.55 g |
| E. | CAB 381-20 resin (cellulose acetate butyrate, Eastman Chemical) | 39.45 g |
| | | 500.00 g |

Compound 1 was added to the above solution at the following levels:

| | |
|---|---|
| A. | 0.20% by weight of the total solution |
| B. | 0.40% by weight of the total solution |
| C. | 0.80% by weight of the total solution |
| D. | 1.60% by weight of the total solution |

Solutions were coated at 2.0 mils (0.05 mm) wet then dried 3.0 min at 180° F., and the dry coat weight was approximately 0.20 g/ft$^2$.

The following results were obtained:

| Sample | Ohms (Keithly Unit) |
|---|---|
| Control (No Compound 1) | $6.7 \times 10^{15}$ |
| A | $5.9 \times 10^{15}$ |

-continued

| Sample | Ohms (Keithly Unit) |
|---|---|
| B | $5.3 \times 10^{15}$ |
| C | $1.1 \times 10^{13}$ |
| D | $1.6 \times 10^{12}$ |

The surface restivity was greatly reduced when compound 1 was added to the backcoat solution and the concentration levels increased.

Example 2

Binder Solution

| | |
|---|---|
| 87.2788 | gm MEK |
| 12.5464 | gm CAB 381-20 |
| 00.1748 | gm Vitel PE200 |
| 100.00 | gm |

Anti-halation Backside Coating

| | |
|---|---|
| 50.0 | gm Binder solution |
| 2.0 | gm MEK |
| 0.03 | gm Anti-halation dye |
| 52.03 | gm |

Compound 1 was added to the above anti-halation backside coat at the following levels by weight.

| | | | |
|---|---|---|---|
| A. | 0.31 gm | D. | 1.5 gm |
| B. | 0.51 gm | E. | 3.0 gm |
| C. | 0.76 gm | | |

Results: Coated samples were tested on the E.T.S. Static Decay Meter in a 70° F./20% R.H. chamber.

A. The E.T.S. static decay meter applies a 5000 volt, maximum, electrical charge to the coated samples. The coated sample must accept a 3000 volt charge, for the data to be acceptable.

B. 0% indicates 100% of the electrical charge has been dissipated in the indicated time in seconds.

C. 10% indicates 90% of the electrical charge has been dissipated in the indicated time in seconds.

D. 50% indicates 50% of the electrical charge has been dissipated in the indicated time in seconds.

| Sample | | Intl | Time Sec | Time Sec | Time Sec | Volts |
|---|---|---|---|---|---|---|
| Control | + | Chg | 0% 99+ | 10% 99+ | 50% 0.01 | 2500 |
| (No | − | 250 | 0.0 | 0.01 | 0.01 | 2250 |
| Compound) | | | | | | |
| A | + | 0 | 24.06 | 13.33 | 0.91 | 5000 |
| | − | | 43.84 | 13.71 | 2.10 | |
| B | + | 0 | 10.51 | 2.89 | 0.38 | 5000 |
| | − | | 9.35 | 2.88 | 0.35 | |
| C | + | 0 | 4.05 | 1.07 | 0.16 | 5000+ |
| | − | | 4.18 | 1.13 | 0.21 | |

-continued

| Sample | | Intl | Time Sec | Time Sec | Time Sec | Volts |
|---|---|---|---|---|---|---|
| D | + | 0 | 1.98 | 0.58 | 0.11 | 5000+ |
| | − | | 1.48 | 0.59 | 0.12 | |
| E | + | 0 | 0.46 | 0.29 | 0.06 | 5000+ |
| | − | | 0.36 | 0.27 | 0.06 | |

The level of static was greatly reduces when compound 1 was added to the anti-halation backcoat solution and when the levels were increased.

Compound 1 is $$C_8F_{17}SO_3^{-+}NH_3(CH_2CH_2O)_{12}CH_2CH_2N^+H_3SO_3^-C_8F_{17}.$$

What is claimed is:

1. A polymeric film having an antistatic coating thereon, said coating comprising an oleophilic hydrophobic polymer and at least one compound of the formula $$(R_fSO_3)^{-+}NR_3(CH_2CH_2O)_m(CH_2CH_2CH_2O)_n(CH_2)_pN^+R_3^-(SO_3R_f)$$

wherein each $R_f$ is independently a highly fluorinated alkyl group of 1 to 20 carbon atoms, $R_3$ is H or alkyl of 1 to 20 carbon atoms, m is 0 to 20, n is 0 to 20, m plus n is at least 2, and p is 1 to 8.

2. The polymeric film of claim 1 wherein $R_f$ is a perfluorinated alkyl group.

3. The polymeric film of claim 2 wherein $R_3$ is alkyl of 1 to 4 carbon atoms or H.

4. The polymeric film of claim 2 wherein m plus n is between 4 and 12.

5. The polymeric film of claim 2 wherein said polymeric film comprises a polyester, cellulose acetate or cellulose triacetate film.

6. The polymeric film of claim 1 wherein $R_3$ is alkyl of 1 to 4 carbon atoms or H.

7. The polymeric film of claim 6 wherein said polymeric film comprises a polyester, cellulose acetate or cellulose triacetate film.

8. The polymeric film of claim 1 wherein m plus n is between 4 and 12.

9. The polymeric film of claim 1 wherein said polymeric film comprises a polyester, cellulose acetate or cellulose triacetate film.

10. A polymeric film having an antistatic coating on at least one surface thereof, said coating comprising an oleophilic polymeric film forming binder in an organic solvent and at least one compound of the formula:

$$(R_fSO_3^-)^+NR_3(R^1O)_m(R^2O)_n(R^3)_p{}^+NR_3(^-SO_3R_f)$$

wherein each $R_f$ is independently a highly fluorinated alkyl group of 1 to 20 carbon atoms, R is H or alkyl group of 1 to 20 carbon atoms, $R^1O$ is an ethyleneoxy, propyleneoxy or butyleneoxy group, $R^2O$ is an ethyleneoxy, propyleneoxy, or butyleneoxy group, $R^3$ is an alkylene group of 1 to 8 carbon atoms, m is 0 to 20, n is 0 to 20, m plus n is at least 2, and p is 1 to 8.

11. The polymeric film of claim 10 wherein said organic solvent comprises less than 5% by weight of water.

12. The polymeric film of claim 11 wherein said organic solvent comprises methyl ethyl ketone, methyl isobutyl ketone, or dimethyl formamide.

13. The polymeric film of claim 12 wherein $R_f$ is a perfluorinated alkyl group.

14. The polymeric film of claim 11 wherein $R_f$ is a perfluorinated alkyl group.

15. The polymeric film of claim 10 wherein said organic solvent is selected from the group consisting of methyl ethyl ketone, methyl isobutyl ketone, and dimethyl formamide.

16. The polymeric film of claim 15 wherein $R_f$ is a perfluorinated alkyl group.

17. The polymeric film of claim 10 wherein said oleophilic binder is selected from the group consisting of polyester resins, polyvinyl acetals, cellulose acetate, cellulose acetate esters, polyvinylidene chloride and mixtures thereof.

18. The polymeric film of claim 17 wherein said organic solvent comprises methyl ethyl ketone, methyl isobutyl ketone, and dimethyl formamide.

19. The polymeric film of claim 18 wherein said organic solvent contains less than 5% by weight of water.

20. The polymeric film of claim 19 wherein $R_f$ is a perfluorinated alkyl group.

21. The polymeric film of claim 18 wherein $R_f$ is a perfluorinated alkyl group.

22. The polymeric film of claim 17 wherein $R_f$ is a perfluorinated alkyl group.

23. The polymeric film of claim 10 wherein $R_f$ is a perfluorinated alkyl group.

* * * * *